US012669980B1

(12) United States Patent      (10) Patent No.:    US 12,669,980 B1

Xu et al.                    (45) Date of Patent:     Jun. 30, 2026

(54) MIXED-PRECISION COMPUTATIONS WITH STATE COMPRESSION

(71) Applicant: Amazon Technologies, Inc., Seattle, WA (US)

(72) Inventors: Kun Xu, Austin, TX (US); Sundeep Amirineni, Cedar Park, TX (US); Paul Gilbert Meyer, Jericho, VT (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 960 days.

(21) Appl. No.: 17/807,222

(22) Filed: Jun. 16, 2022

(51) Int. Cl.
| | |
|---|---|
| *G06F 7/499* | (2006.01) |
| *G06F 7/544* | (2006.01) |
| *G06F 12/02* | (2006.01) |
| *G06N 3/0495* | (2023.01) |

(52) U.S. Cl.
CPC .......... G06F 7/49947 (2013.01); G06F 12/02 (2013.01); *G06F 7/5443* (2013.01); *G06F 2212/401* (2013.01); *G06N 3/0495* (2023.01)

(58) Field of Classification Search
CPC .. G06N 3/0495; G06F 7/49942–49947; G06F 7/5443; G06F 2207/3816–3824; G06F 5/01–012; G06F 2212/401; G06F 12/02
See application file for complete search history.

(56) References Cited

U.S. PATENT DOCUMENTS

| | | | | |
|---|---|---|---|---|
| 12,260,214 B1 * | 3/2025 | Meyer | .................. | G06F 9/3887 |
| 12,524,372 B2 * | 1/2026 | Badaroglu | .......... | G06F 15/7821 |
| 2002/0093437 A1 * | 7/2002 | Freidhof | ............ | H03H 17/0288 |
| | | | | 341/61 |
| 2013/0002457 A1 * | 1/2013 | Tudose | ................. | H04L 7/0029 |
| | | | | 341/61 |
| 2018/0046905 A1 * | 2/2018 | Li | ........................... | G06N 3/063 |
| 2021/0240925 A1 * | 8/2021 | Kwon | ................... | G06F 40/205 |
| 2023/0004523 A1 * | 1/2023 | Meyer | .................. | G06F 7/5443 |
| 2023/0031841 A1 * | 2/2023 | Badaroglu | ............ | G06F 7/5443 |
| 2023/0115373 A1 * | 4/2023 | Badaroglu | ............. | G06N 3/063 |
| | | | | 708/670 |

OTHER PUBLICATIONS

Huang, M. et al. "Introducing native PyTorch automatic mixed precision for faster training on Nvidia GPUs", *PyTorch Blog*, Jul. 28, 2020, URL: https://pytorch.org/blog/accelerating-training-on-nvidia-gpus-with-pytorch-automatic-mixed-precision/ [retrieved Jun. 16, 2022].

(Continued)

*Primary Examiner* — Matthew D Sandifer
(74) *Attorney, Agent, or Firm* — Weaver Austin Villeneuve & Sampson LLP

(57)          ABSTRACT

A technique for matching the throughput between writing into and reading from a memory can include receiving, in parallel, computational results in a high precision format for storing into the memory at a first frequency, and storing the computational results in the memory. The technique may further include rounding the computational results using round-to-the-nearest-even or stochastic rounding to down-convert the computational results from the high precision format to a low precision format in parallel, and outputting the computational results in the low precision format in parallel from the memory at a second frequency.

20 Claims, 10 Drawing Sheets

700

Receive, in parallel, computational results in a high precision format for storing into a memory at a first frequency
702

Store the computational results in the memory
704

Round the computational results to down-convert the computational results from the high precision format to a low precision format in parallel
706

Output the computational results in the low precision format in parallel from the memory at a second frequency
708

(56) References Cited

OTHER PUBLICATIONS

Micikevicius, P. "Mixed-Precision Training of Deep Neural Networks", *Nvidia Developer Technical Blog*, Oct. 11, 2017, URL: https://developer.nvidia.com/blog/mixed-precision-training-deep-neural-networks/ [retrieved Jun. 16, 2022].

U.S. Appl. No. 17/657,300, Desai et al., filed Mar. 30, 2022.

Wang, S. et al. "BFloat16: The secret to high performance on Cloud TPUs", *AI & Machine Learning—Google Cloud Blog*, Aug. 23, 2019, URL: https://cloud.google.com/blog/products/ai-machine-learning/bfloat16-the-secret-to-high-performance-on-cloud-tpus [retrieved Jun. 16, 2022].

* cited by examiner

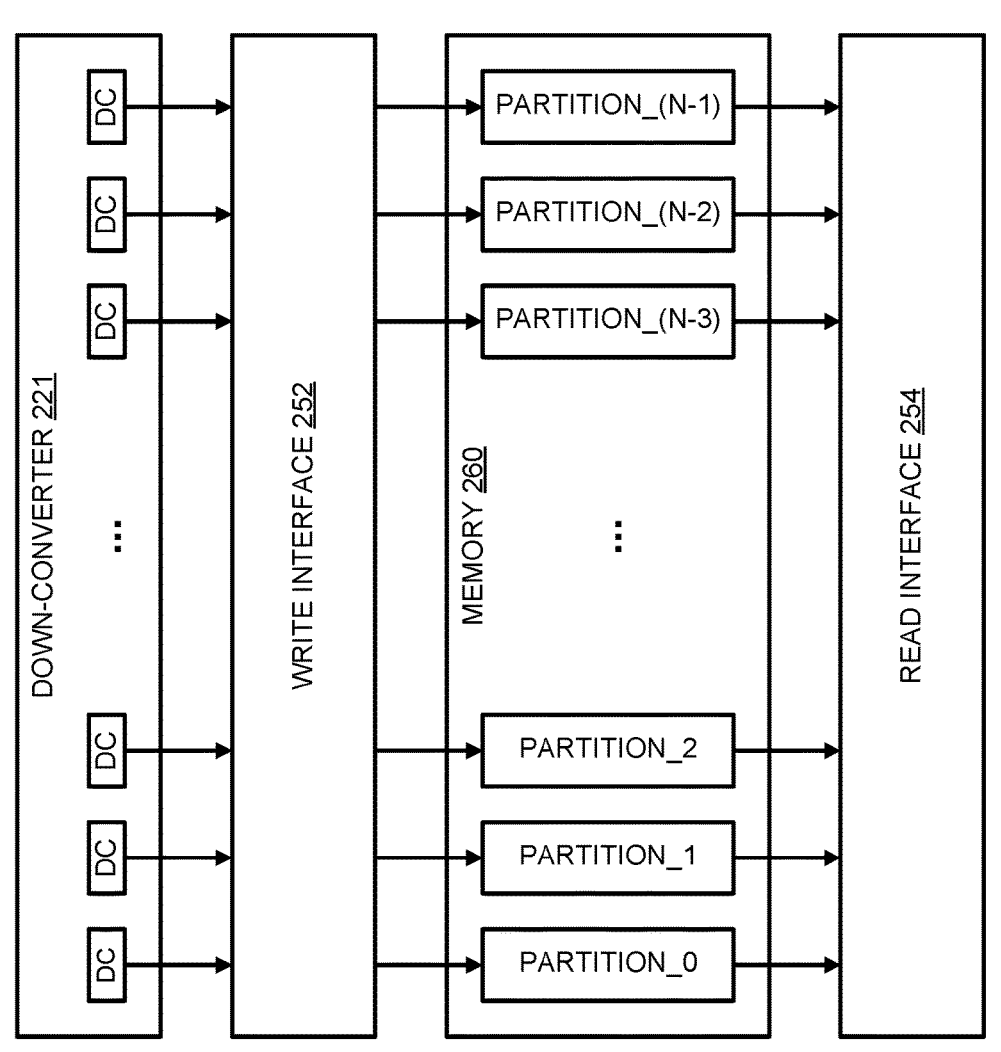
FIG. 2

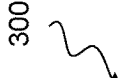
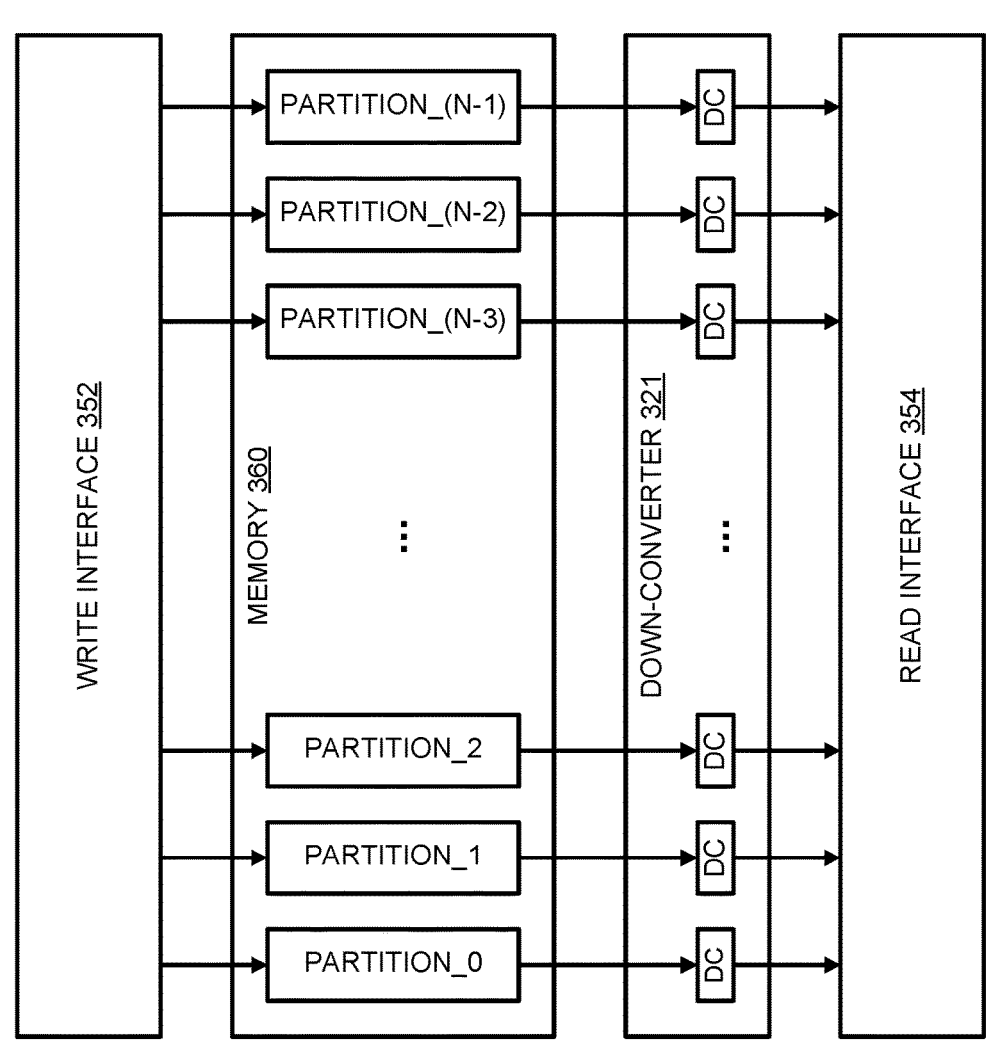
FIG. 3

400

DATA_IN

700

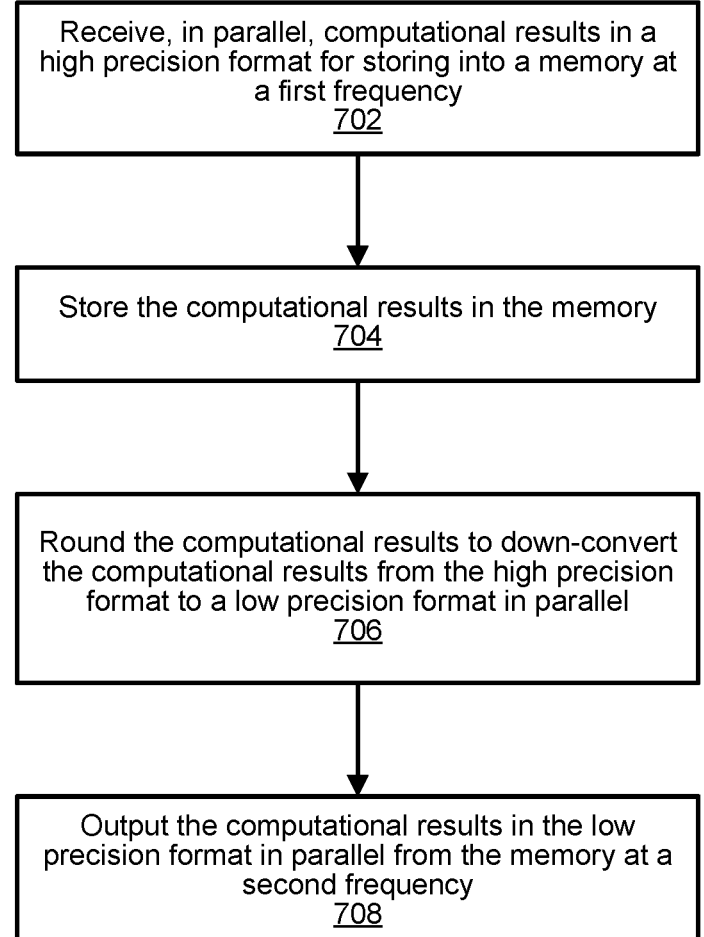

Receive, in parallel, computational results in a
high precision format for storing into a memory at
a first frequency
702

Store the computational results in the memory
704

Round the computational results to down-convert
the computational results from the high precision
format to a low precision format in parallel
706

Output the computational results in the low
precision format in parallel from the memory at a
second frequency
708

FIG. 7

MIXED-PRECISION COMPUTATIONS WITH STATE COMPRESSION

BACKGROUND

Artificial neural networks utilize a computational model with an architecture based on biological neural networks. Computations in an artificial neural network are performed using a set of weights representing a neural network model. The weights can be combined with input data (also referred to as feature maps) to perform an inference operation. For example, in a computer vision application, the neural network can combine the weights with an input image to extract certain features of the image. Based on the extracted features, the neural network can generate a decision as to whether a particular object is depicted in the image. Neural networks can be trained with training data to adjust the weight values of the model to improve accuracy of the inference operation.

BRIEF DESCRIPTION OF THE DRAWINGS

Various embodiments in accordance with the present disclosure will be described with reference to the drawings, in which:

FIG. 2 illustrates a simplified block diagram of an example of an integrated circuit device;

FIG. 3 illustrates a simplified block diagram of another example of an integrated circuit device;

FIG. 7 illustrates a flow diagram of an example of a process for operating a buffer;

DETAILED DESCRIPTION

Figure 1:
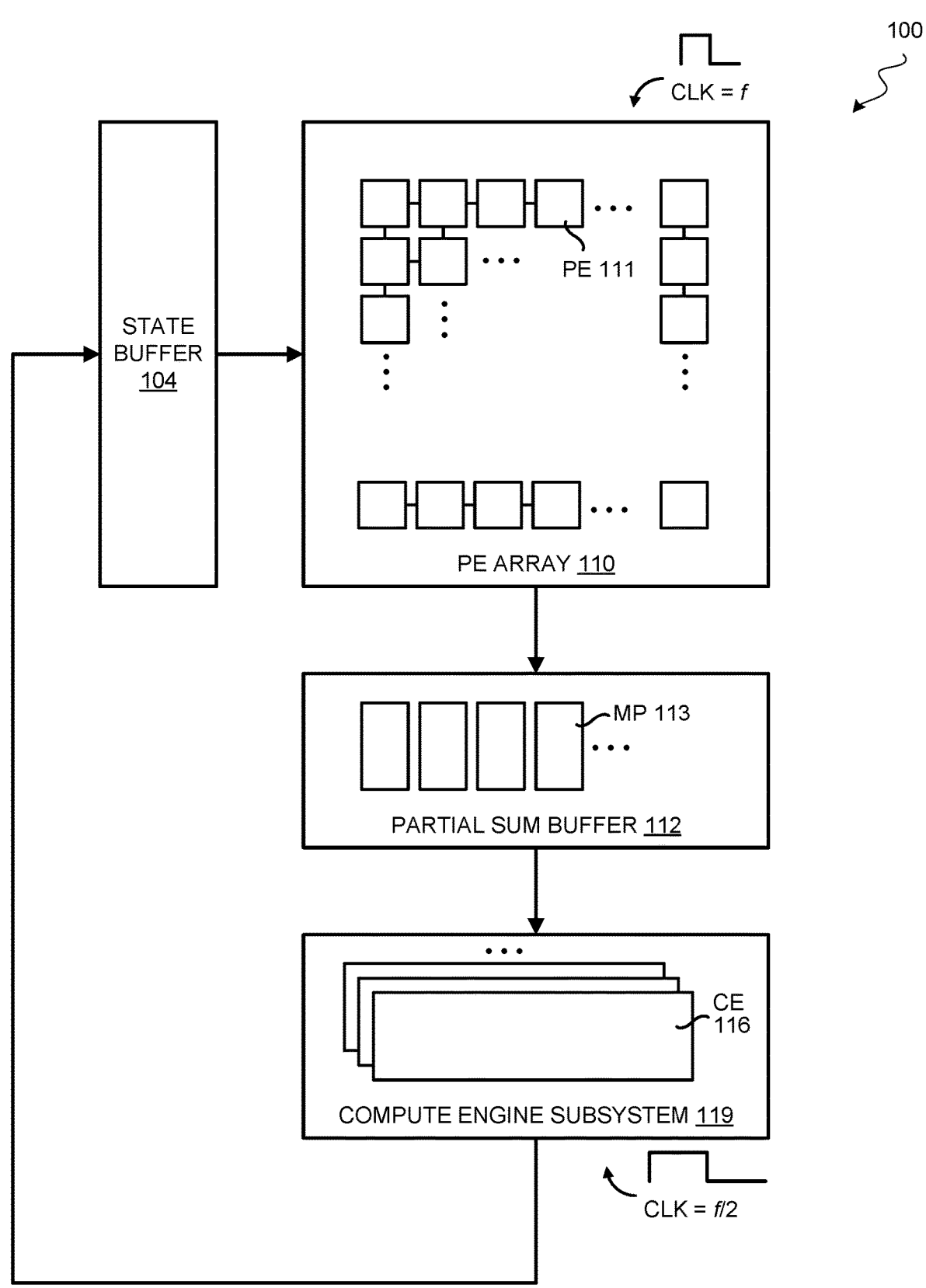
FIG. 1 illustrates a simplified block diagram of an example of a neutral network processor.

Neural networks rely heavily on matrix computations. Weights and feature maps are typically represented as matrices, and a series of matrix multiplications (e.g., dot-products) are performed on these matrices and intermediate results at the various layers of a neural networks to generate a computational result. To perform these computations efficiently, accelerators such as neural network processors can be implemented using a processing engine (PE) array (e.g., a systolic array) having processing engines arranged in rows and columns. Each processing engine can perform a multiply-and-add operation by multiplying a feature map value with a weight value to generate a multiplication result, and adding the multiplication result to a partial sum input to generate a partial sum output. The partial sums accumulated along the column direction of the PE array can be referred to as intermediate results, and the intermediate results can be subjected to certain computations such as an activation or pooling function before being feedback to the PE array for another matrix multiplication operation.

The majority of the neural network computations are performed in the PE array. As such, various techniques are employed to improve the performance of the PE array. One such technique is to utilize mixed-precision computations. In a mixed-precision computation, the multiplications are performed using a low precision format such as 16-bit floating point (FP16) format or 16-bit brain floating point (BF16) format, and the accumulation is performed using a high precision format such as 32-bit floating point (FP32) format. By reducing the number of data bits employed in the multiplication operation, the physical area of the processing engine can be significantly reduced and the operating frequency of the PE array can be increased. Even though the multiplication is done in a low precision format, a high accuracy neural network model can still be achieved by performing the accumulation in the high precision format.

As mentioned above, the intermediate results generated from the PE array can be subjected to an activation or pooling function before being fed back to the PE array. The compute engines responsible for performing these functions may operate at a lower frequency as compared to the PE array. For example, in some neural network processor implementations, these compute engines may operate at half the clock frequency of the PE array. In order to temporarily cache the intermediate results being generated by the PE array while the compute engines are operating on the previous set of intermediate results, a partial sum buffer can be implemented in the datapath between the PE array and the compute engines. However, even with the use of a partial sum buffer, a performance bottleneck can still occur if the eviction rate of the partial sum buffer is not able to keep up with the throughput of the PE array.

One way to match the throughput of the compute engines with the PE array is to double the operating frequency of the compute engines to match the operating frequency of the PE array. Another way is to double the number of compute engines. However, both of these techniques can significantly increase the physical area of the neural network processor.

To limit the impact on the chip area while improving the throughput of the compute engines, the intermediate results can be compressed by being down-converted from the high precision format to the low precision format before being processed by the compute engines. For example, by down-converting the 32-bit FP32 intermediate results to 16-bit FP16 or BF 16 format, two 16-bit intermediate results can be processed in place of one 32-bit intermediate result. The throughput of the compute engines can be effectively doubled to match the throughput of the PE array, even though the compute engines may be operating at half the frequency of the PE array. The down-conversion can be performed before the intermediate results are written into the memory of the partial sum buffer, or can be performed when the intermediate results are read out from the memory of the partial sum buffer. To help preserve some of the precision when down-converting the data format, the intermediate results can be rounded using round-to-the-nearest-even (RNE) or stochastic rounding (SR). In some implementations, the neural network processor can be configurable to select which rounding technique to employ, as well as select between performing the down-conversion before or after the intermediate results are written into the memory of the partial sum buffer.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a simplified block diagram of an example of a neural network processor 100. Neural network processor 100 may include a state buffer 104, a PE array 110, a partial sum buffer 112, and a compute engine subsystem 119. PE array 110 includes processing engines 111 arranged in rows and columns. Each of the processing engine is operable to perform a multiply-and-add operation. Weights and input feature map values are initially stored in state buffer 104. During operation, a set of weight values can be loaded from state buffer 104 into PE array 110. The set of weight values can be retained in PE array 110 while input feature map values are shifted across PE array 110 from state buffer 104 along the row direction. At each clock cycle, the processing engine can multiply the feature map value shifted into the processing engine with the previously stored weight value, and add the multiplication result to a partial sum input provided along the column direction to generate a partial sum output. The partial sum output from the processing engine is provided as the partial sum input to the next processing engine along the column. When the partial sum is outputted from the last processing engine of a column, the partial sum output generated by the column of the PE array 110 is stored as an intermediate result in partial sum buffer 112.

Partial sum buffer 112 may include multiple memory partitions 113 to store the partial sums being outputted from the columns of PE array 110. The number of memory partitions in partial sum buffer 112 can be equal to the number of columns in PE array 110 such that each column of PE array 110 has a corresponding memory partition to store the partial sum values. In addition to providing temporary storage for the partial sums, partial sum buffer 112 may also have the capability to accumulate the partial sum values. Larger matrix multiplication operations may require multiple passes through the PE array 110, and the partial sums from each pass can be accumulated in the memory partition. For example, each memory partition may include multiple memory banks and an adder. The multiple memory banks can provide multiple buffer stages to store a series of partial sums outputted from a column of the PE array 110, and the adder can be used to add the partial sum values together to generate an accumulated partial sum for storing in the memory partition.

Compute engine subsystem 119 may include multiple compute engines 116. These compute engines may include one or more of an activation engine, a pooling engine, and/or a vector compute engine. Each compute engine may include multiple execution channels. Depending on which stage or which layer of the neural network is being executed, one or more of the compute engines can be reading partial sums concurrently from the partial sum buffer 112. By way of example, the activation engine may apply a rectified linear (ReLU) function, a hyperbolic tangent (tanh) function, a sigmoid function, or other suitable activation function on the partial sums before feeding back the results to the state buffer 104 for loading into the PE array for the next computation. The pooling engine may perform a pooling operation on the partial sums such as maximum pooling, average pooling, or other suitable pooling function before feeding back the results to the state buffer 104 for loading into the PE array for the next computation. Similarly, the vector engine may perform vectorized computations on the partial sums such as vector-add, vector-sum, vector-scale, or other suitable vector mathematical function on the partial sums before feeding back the results to the state buffer 104.

As shown in FIG. 1, the PE array 100 may operate at a higher clock frequency than the compute engines 116 of the compute engine subsystem 119. For example, the compute engines 116 may run at a clock frequency that is half the clock frequency of the PE array 110. Depending on the computations being performed by the compute engine subsystem 119, a performance bottleneck can occur in which the partial sum buffer 112 is not evicted fast enough to keep up with the rate at which new partial sums are generated by the PE array 110. In other words, if the partial sums are not read fast enough from the partial sum buffer 112, the partial sum buffer 112 may become full, and the PE array 110 may need to be stalled until space is available in the partial sum buffer 112 to store new partial sums from the PE array 110.

FIG. 2 illustrates a block diagram of components of an example of an integrated circuit device 200 that can be used to implement a partial sum buffer (e.g., partial sum buffer 112) to increase the throughput of the downstream compute engines. Integrated circuit device 200 may include a write interface 252, a memory 260, and a read interface 254. Memory 260 may include N memory partitions (e.g., partition_0 to partition_(N−1)) operable to store computational results. The computational results can be, for example, partial sums or intermediate results outputted from the columns of a PE array. Each memory partition may correspond to a column of the PE array. Hence, memory 260 may include N memory partitions for N number of columns of the PE array. Each memory partition may include multiple memory banks. The multiple memory banks of a memory partition can provide multiple buffer stages for the computational results. Each memory partition may also include an adder that can be used to accumulate or add together the computational results being written into the memory partition.

Write interface 252 is operable to write the computational results received at a first frequency into the memory partitions of memory 260. For example, a PE array may generate partial sums or intermediate results at the first frequency for storing into memory 260. Write interface 252 may perform bank multiplexing to direct a computational result to the targeted memory bank of a memory partition by generating the proper control signals (e.g., address, bank index, write enable, etc.) to select the target memory bank to write. Write interface 252 may also perform collision detection to assert an interrupt when an attempt is made to write to an occupied memory bank of a memory partition before the bank has been evicted.

Read interface 254 is operable to read the computational results from the memory partitions and output the computational results at a second frequency. For example, a downstream compute engine may operate at the second frequency, and request the computational results at the second frequency from memory 260. Similar to the write interface 252, read interface 254 may generate the proper control signals (e.g., address, bank index, read enable, etc.) to read the computational result from the selected memory bank of each memory partition. Read interface 252 may also perform collision detection to assert an interrupt when multiple requesters (e.g., multiple compute engines) are attempting to access the same memory bank of a memory partition at the same time.

In some implementations, the second frequency at which the computational results are outputted can be lower than the first frequency at which the computational results are written into memory 260. The mismatch in the rate at which new computational results are written and the rate at which stored computational results are read can cause a performance bottleneck in which the memory partitions are not evicted fast enough to free up storage space to store new computational results.

To compensate for the difference in operating frequency and to improve the throughput of the downstream compute engines reading the computational results from memory 260, integrated circuit device 200 may include a down-converter 221 operable to perform down-conversion of the computational results from a high precision format into a low precision format. For example, the high precision format can be a 32-bit floating-point (FP32) format, and the low precision format can be a 16-bit floating-point (FP16) format or a 16-bit brain floating-point (BF16) format. In some implementations, the down-converter 221 can be configurable to select between down-converting to FP16 and down-converting to BF16.

Down-converter 221 may include a down-converter block for each memory partition of memory 260. For example, down-converter 221 may include N down-converter (DC) blocks corresponding to the N memory partitions of memory 260 such that there is a dedicated down-converter block to process the computational results for each memory partition. When down-converting from the high precision format to the low-precision format, each down converter block may perform round-to-the-nearest-even (RNE) or stochastic rounding (SR) on the computational results. In some implementations, down-converter 211 can be capable of supporting both types of rounding, and the type of rounding being used can be selectable. By having N number of down-converter blocks, N computational results can be down-converted and rounded in parallel.

In the example shown in FIG. 2, down-converter 221 is implemented to perform the down-conversion when the computational results are written into the memory partitions. This allows the computational results to be stored in the low precision format in the memory partitions. For example, instead of storing 32-bit FP32 values, a memory partition may store 16-bit FP16 or 16-bit BF16 values. This can effectively double the number of computational results that can be stored in memory 260. However, storing the computational results in the low precision format also means that any accumulation performed by the memory partition may be subjected to a lower precision. Rounding the high precision values with RNE or SR can be used to mitigate against the loss in precision. In some implementations, write interface 252 may include sub-bank selection logic to toggle between writing the 16-bit down-converted computational results to the first half of the 32-bit storage location, and writing to the second half of the 32-bit storage location in a memory bank. When reading from memory 260, two 16-bit FP or BF values can be provided instead of one 32-bit FP value. This can enable the throughput of the downstream compute engine to match the throughput of the PE array in terms of the number of computational results being processed at each clock cycle.

FIG. 3 illustrates a block diagram of components of another example of an integrated circuit device 300 that can be used to implement a partial sum buffer (e.g., partial sum buffer 112) to increase the throughput of the downstream compute engines. Similar to integrated circuit device 200, integrated circuit device 300 may include a write interface 352, a memory 360 having multiple memory partitions, and a read interface 354. Integrated circuit device 300 may also include a down-converter 321 having multiple down-converter blocks. These components may operate in a similar manner as described above, and thus a detailed description of the similar operations need not be repeated.

In the example shown in FIG. 3, down-converter 321 is implemented to perform the down-conversion when the computational results are read from the memory partitions. This allows the computational results to be stored in the high precision format in the memory partitions. For example, the computational results can be stored in a 32-bit FP format in the memory partitions. This allows the computational results to be accumulated with a higher precision in the memory partitions as compared to the implementation of integrated circuit device 200, but does not increase the number of computational results that can be stored by memory 360. When reading the computational results from memory 260, down-converter 321 may access two high precision computational results (e.g., two 32-bit FP32 values), down-convert the two computational results from high precision to low precision by rounding the computational results (e.g., using RNE or SR), and provide the two low precision values (e.g., two 16-bit FP16 or BF16 values) together to the downstream compute engine.

Figure 4:
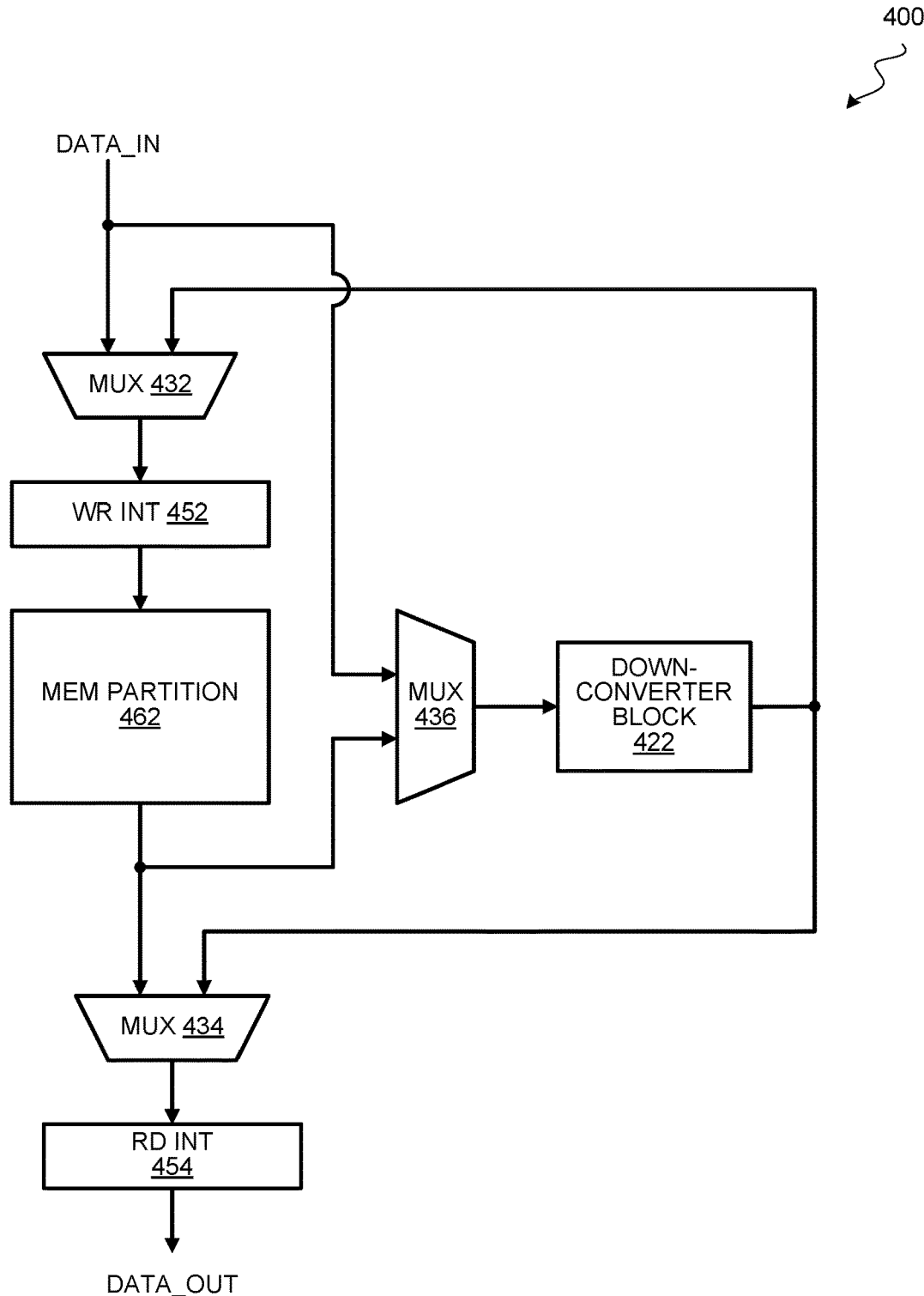
FIG. 4 illustrates a simplified block diagram of a further example of an integrated circuit device.

In some implementations, the location in the datapath at which the down-conversion is performed can be configurable. FIG. 4 illustrates a block diagram of an example of an integrated circuit device 400 that provides an option to switch between down-converting the computational results when writing the computational results into the memory partitions, and down-converting the computational results when reading the computational results from the memory partitions. For ease of illustration, FIG. 4 illustrates the selection logic for one memory partition, but it should be understood that the selection logic can be applied to each memory partition of memory 260 or 360.

Integrated circuit device 400 includes a memory partition 462 which can include multiple memory banks and an adder similar to the memory partitions described above. A write interface 452 performs write operations to write computational results into memory partition 462, and a read interface 454 performs read operations to read computational results from memory partition 462. Integrated circuit device 400 includes a down-converter block 422 that is operable to perform down-conversion on computational results from a high precision format to a low precision format by rounding the computational results. For example, down-converter block 422 may down-convert a FP32 computational result to a FP16 or BF16 computational result. Down-converter block 422 may use RNE or SR to round the computational result.

The down-conversion is typically not expected to be performed at both the input to memory partition 462 and the output from memory partition 462. Hence, a single down-converter block 422 can be shared between the two configurations. To perform down-conversion when writing into memory partition 462, multiplexor 436 can select the data input (DATA_IN) as the input to the down-converter block 422, multiplexor 432 can select the output of down-converter block 422 as the input to write interface 452, and multiplexor 434 can select the output of memory partition 462 to provide to read interface 454 as the data output (DATA_OUT). To perform down-conversion when reading from memory partition 462, multiplexor 432 can select the data input (DATA_IN) as the input to write interface 452, multiplexor 436 can select the output of memory partition 462 as the input to the down-converter block 422, and multiplexor 434 can select the output of down-converter block 422 to provide to read interface 454 as the data output (DATA_OUT). The down-conversion can also be disabled by configuring multiplexor 432 to select the data input (DATA_IN) as the input to write interface 452, and multiplexor 434 to select the output of memory partition 462 as the data output (DATA_OUT).

As described above, down-converting when writing the computational results into the memory partitions can increase the storage capacity of the memory partitions but may result in a reduction in precision when accumulating the computational results in the memory partitions. In contrast, down-converting when reading the computational results may provide better preservation of the precision when accumulating the computational results in the memory partitions. By providing the capability to switch between down-converting the computational results when writing into the memory partitions, and down-converting the computational results when reading from the memory partitions, the trade-off between storage capacity and accumulation precision can be chosen based on the specific application and/or neural network model being executed.

Figure 5:
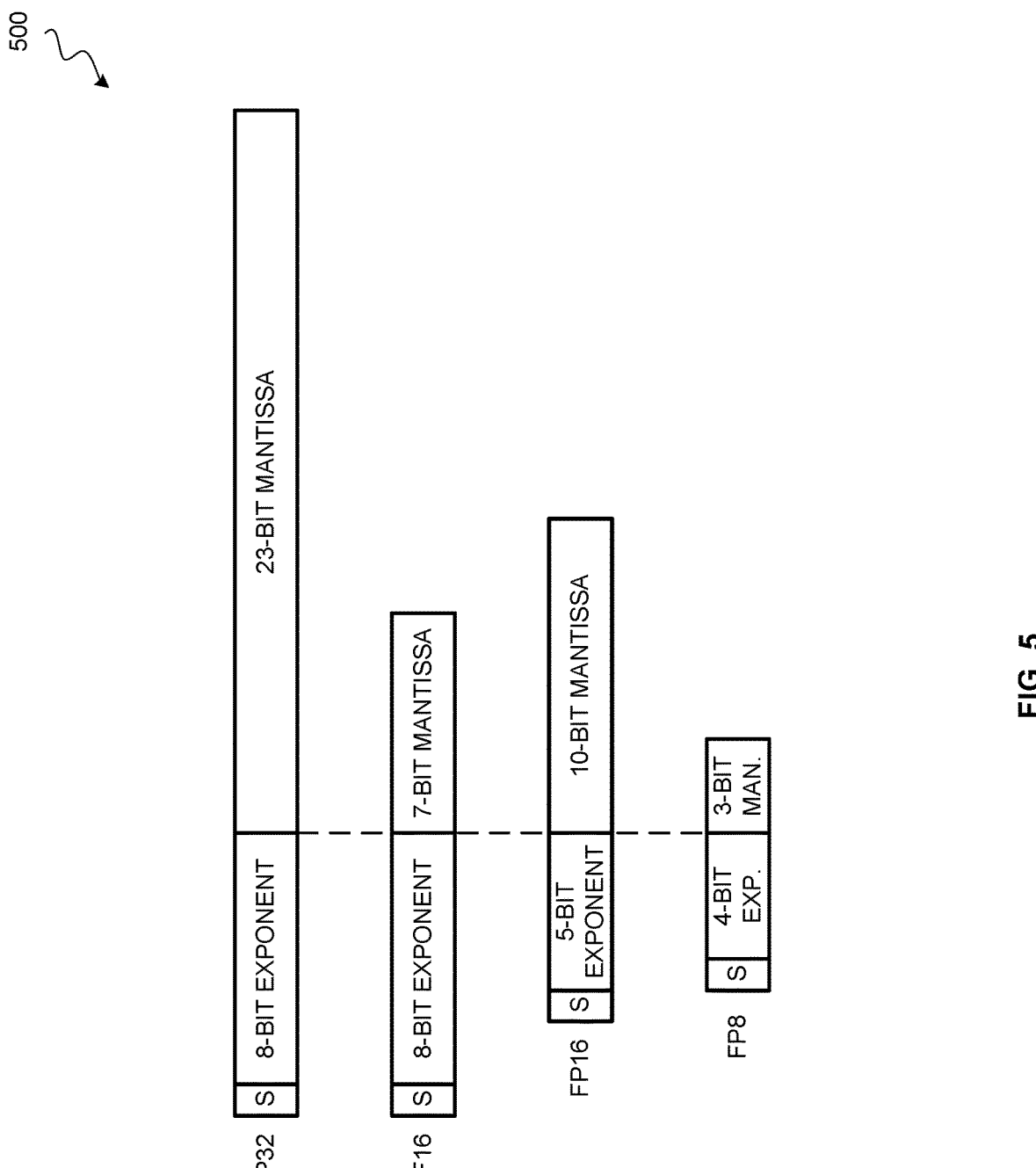
FIG. 5 illustrates examples of various data formats.

FIG. 5 illustrates examples of some of the supported data formats 500 for the computational results. The 32-bit floating-point (FP32) format can be a high precision format. FP32 includes a single sign bit, an 8-bit exponent, and a 23-bit mantissa. The 16-bit brain floating-point (BF16) format can be a low precision format. BF16 includes a single sign bit, an 8-bit exponent, and a 7-bit mantissa. The 16-bit floating-point (FP16) format can be another low precision format. FP16 includes a single sign bit, a 5-bit exponent, and a 10-bit mantissa.

Down-conversion from FP32 to BF16 can be performed by rounding the 23-bit mantissa of FP32 to a 7-bit mantissa. The sign bit and the 8-bit exponent from FP32 can be retained when down-converting from FP32 to BF16. To preserve some of the precision, the rounding of the 23-bit mantissa to the 7-bit mantissa can be performed using round-to-the-nearest-even (RNE) or stochastic rounding (SR).

Down-conversion from FP32 to FP16 can be performed by rounding the 23-bit mantissa of FP32 to a 10-bit mantissa. The sign bit can be retained when down-converting from FP32 to BF16. The 8-bit exponent can be converted to the 5-bit exponent, for example, by saturating the dynamic range of the 8-bit exponent to the 5-bit exponent. Similar to down-conversion from FP32 to BF16, the rounding of the 23-bit mantissa to the 10-bit mantissa for FP16 can be performed using round-to-the-nearest-even (RNE) or stochastic rounding (SR).

The down-conversion techniques described herein can also be used to down-convert from FP32 to an 8-bit floating-point (FP8) format, or from BP16 or FP16 to FP8. The sign bit can be retained when down-converting to FP8. The exponent can be converted, for example, by saturating the dynamic range. The mantissa can be down-converted to a 3-bit mantissa using round-to-the-nearest-even (RNE) or stochastic rounding (SR). It should also be noted that other rounding modes can be supported such as round-up, round-down, and/or round-to-zero, etc.

Figure 6:
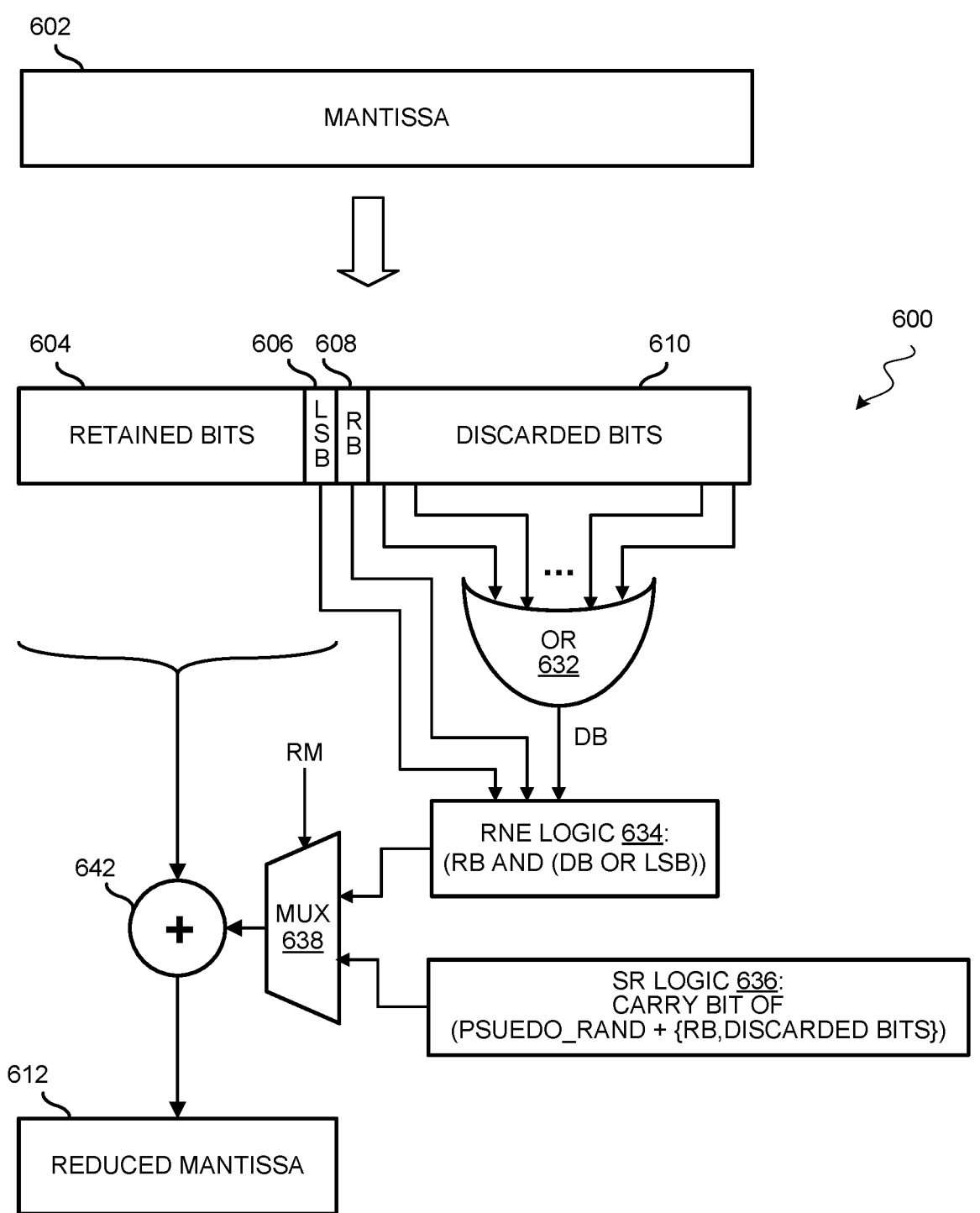
FIG. 6 illustrates a simplified block diagram of an example of a down-converter block.

FIG. 6 illustrates a block diagram of an example of rounding circuitry 600 that can be implemented in a down-converter block such as any of the down-converter blocks described herein. Rounding circuitry 600 may take as input a high precision mantissa 602 (e.g., 23-bit mantissa of a 32-bit FP32 value), and down-convert the high precision mantissa 602 to a low precision reduced mantissa 612 (e.g., 10-bit mantissa of a 16-bit FP16 value). For ease of illustration, the example shown in FIG. 6 down-converts the mantissa of FP32 to FP16, but a similar technique can be used to down-convert the mantissa of FP32 to BF16.

Mantissa 602 can be decomposed into a set of retained bits 604, a least-significant bit (LSB) 606 of the resulting reduced mantissa 612, a rounding bit (RB) 608, and a set of discarded bits 610. For example, when down-converting from a 23-bit mantissa to a 10-bit mantissa, retained bits 604 may correspond to bits[22:14] of mantissa 602, LSB 606 may correspond to bit[13] of mantissa 602, RB 608 may correspond to bit[12] of mantissa 602, and discarded bits 610 may correspond to bits [11:0] of mantissa 602. Conversion of a 23-bit mantissa to a 7-bit mantissa for BF16 can be performed using a similar technique by adjusting the positions of the LSB 606 and RB 608.

Rounding circuitry 600 can select between a round-to-the-nearest-even (RNE) mode and a stochastic rounding (SR) mode. In RNE mode, values that are midway between two rounded values are rounded up if the upper rounded value is even, or rounded down if the lower rounded value is even. By way of example, in decimal representation, 3.5 is rounded to 4, and 2.5 is rounded to 2. Values that are not midway are rounded to their nearest rounded value. For instance, in decimal representation, 3.6 is rounded to 4, and 3.4 is rounded to 3. In binary representation, a midway point occurs when RB 608 is 1 followed by all 0's in the discarded bits 610. When this condition is met, LSB 606 is rounded to 0. Hence, if LSB 606 is already 0, the resulting rounded value is simply the concatenation of the retained bits 604 and LSB 606. If LSB 606 is 1, the resulting rounded value is generated by adding 1 to the concatenation of the retained bits 604 and LSB 606. For values that are not at the midway point (non-zero values in discarded bits 610), if RB 608 is 0, the resulting rounded value is the concatenation of the retained bits 604 and LSB 606. If RB 608 is 1, the resulting rounded value is generated by adding 1 to the concatenation of the retained bits 604 and LSB 606.

To implement the RNE operation, rounding circuitry 600 may include an OR gate 632 to perform a logical OR of the discard bits 610 to generate a DB signal. Hence, if any of the discarded bits 610 is a 1, the DB signal will also be a logic one. If all of the discarded bits 610 are O's, the DB signal will be a logic zero. The DB signal, RB 608, an LSB 606 are inputted into round-to-the-nearest-even (RNE) logic 634. RNE logic 634 performs the logical operation of OR-ing the DB signal with LSB 606, and AND-ing the result with RB 608. RNE logic 634 generates a 1 or a 0, which can be added to the concatenation of retained bits 604 and LSB 606 to generate the rounded value in RNE mode.

In stochastic rounding (SR) mode, a value between two rounded values is rounded according to a probability based on the distance to the rounded values. For a value x between rounded values $x_1$ and $x_2$ in which $x_1 < x_2$, x is rounded down to $x_1$ with a probability of $(x_2-x)/(x_2-x_1)$, and x is rounded up to $x_2$ with a probability of $(x-x_1)/(x_2-x_1)$. By way of example, in decimal representation, 1.2 is rounded to 2 with a probability of 20% and rounded to 1 with a probability of 80%. In binary representation, to implement the SR operation, rounding circuitry 600 may implement SR logic 636 which includes a pseudo-random number generator and an adder. The pseudo-random number generator may generate a pseudo-random number containing the same number of bits as the concatenation of RB 608 and discarded bits 610. The generated pseudo-random number is then added to the concatenation of RB 608 and discarded bits 610. The carry bit of the summation result, which is either a 0 or a 1, can then be added to the concatenation of the retained bits 604 and LSB 606 to generate the rounded value in SR mode. In some implementations, to generate the pseudo-random number in a deterministic manner to control the probability distribution of the generated values, a linear-feedback shift register (LFSR) can be used. The LFSR can be seeded with a value such as the concatenation of RB 608 and discarded bits 610.

To select between RNE and SR modes, rounding circuitry 600 may include a rounding mode (RM) multiplexor 638. Multiplexor 638 selects the output of RNE logic 634 to perform round-to-the-nearest-even, and selects the output of SR logic 636 to perform stochastic rounding. The output of multiplexor 638, which is either a 0 or a 1, is provided to adder 642 to be added with the concatenation of retained bits 604 and LSB 606 to generate the reduced mantissa 612. In some implementations, the down-converter can be implemented to just perform round-to-the-nearest-even. In such implementations, SR logic 636 and multiplexor 638 can be omitted. Similarly, in some implementations, the down-converter can be implemented to just perform stochastic rounding. In such implementations, OR gate 632, RNE logic 634, and multiplexor 638 can be omitted. It should also be understood that the circuitry shown in FIG. 6 is just an example, and that other logic circuitry can be used to implement the RNE and/or SR operations. Moreover, although only two round modes are shown, rounding circuitry 600 may also support other rounding modes such as round-up, round-down, and/or round-to-zero. Rounding circuitry 600 can be implemented to support two or more of the rounding modes described herein, and can be configurable to switch between the supported rounding modes.

FIG. 7 illustrates a flow diagram of an example of a process 700 for operating a computational results buffer. Process 700 can be implemented, for example, by a partial sum buffer (e.g., partial sum buffer 112) of a neural network processor. In some implementations, the computational results buffer may include circuitry such as any of those described with reference to integrated circuit devices 200, 300, and/or 400, and may include circuitry described with reference to rounding circuitry 600.

The computational results buffer implementing process 700 can be used, for example, to store partial sums generated by a PE array of a neural network processor, and may include a down-converter operable to down-convert partial sums from a high precision format into a low precision format. A downstream compute engine subsystem may perform computations on the partial sums in the low precision format obtained from the computational results buffer to increase the processing throughput. In the neural network processor context, the downstream compute engine subsystem may include compute engines such as one or more of an activation engine, a pooling engine, and/or a vector compute engine.

Process 700 may begin at block 702 by receiving, in parallel, computational results in a high precision format for storing into a memory at a first frequency. The memory may include a set of memory partitions. For example, the computational results can be partial sums being generated from the columns of a PE array. The number of memory partitions may correspond to the number of columns in the PE array such that the partial sums from a particular column can be stored in a corresponding memory partition. The PE array may operate at a first clock frequency corresponding to the frequency at which the partial sums are received by the memory partitions.

At block 704, the computational results are stored in the memory. At block 706, the computational results can be rounded (e.g., RNE,SR, round-up, round-down, or round-to-zero), by a down-converter, to down-convert the computational results from the high precision format to a low precision format (e.g., from FP32 to FP16 or BF16, from FP32 to FP8, or from FP16 or BF16 to FP8). The down-converter may include a down-convert block for each of the memory partitions to enable the rounding and the down-conversion to be performed in parallel on the computational results. In some implementations, block 706 can be performed after block 704 such that the computational results are stored in the high precision format in the memory, and the rounding of the computational results is performed after the computational results are read from the memory. In some implementations, block 704 can be performed after block 706 such that the computational results are stored in the low precision format in the memory, and the rounding of the computational results is performed before writing the computational results into the memory.

At block 706, the computational results are outputted in the low precision format in parallel from the memory at a second frequency. For example, the computational results can be partial sums being processed by downstream compute engines (e.g., activation engine, pooling engine, and/or vector compute engine) before feeding back the processed results to the PE array. The compute engines may operate at a second clock frequency corresponding to the second frequency at which the partial sums are read from the memory. In some implementations, the first frequency can be higher than the second frequency.

The down-conversion of the computational results performed along the datapath between the PE array and the compute engines allows the eviction rate of the computational results buffer to keep up with the rate at which the PE array writes into the buffer. For example, the compute engines may operate at half of the clock frequency of the PE array. The down-conversion enables the compute engines to match a throughput of the PE array by allowing the compute engines to double the number of computational results read from the computational results buffer per clock cycle.

More generally, the throughput can be matched when a ratio of the frequency of the computational results generation to the frequency of the computational results consumption is equal to the ratio of the number bits used in the high precision format to the low precision format. Although certain aspects of the disclosure have been described with the specific ratio of 2:1 for the frequencies and bit precisions (e.g., 32 bits to 16 bits), the techniques can be used with other ratios. It should also be noted that the frequency ratio need not match the bit precision ratio. For example, down-converting from a 32-bit format to a 16-bit format can still be performed to improve the throughput of the compute engines and eviction rate of the memory partitions when the compute engines operate at ¾ of the frequency of the PE array. In other words, it is not necessary to have an exact match on the throughput of PE array and the compute engines.

In some implementations, the down-converter block for each memory partition can be configurable to select one or more of the type of conversion being performed (e.g., FP32 to FP16, FP32 to BF16), the location of the conversion being performed (e.g., when writing into the memory partition, or when reading from the memory partition), and/or the type of rounding being performed (e.g., round-to-the-nearest-even, or stochastic rounding). The down-converter block for each memory partition can also be disabled such that no down-conversion is performed. In some implementations, the down-conversion block for each memory partition can be independently configurable from the other down-conversion blocks. This can be useful for PE arrays that support tiling in which different sections of the PE array can be concurrently performing different matrix multiplications. The independent configurability allows different rounding and accumulation precision to be applied to different columns such that these attributes can be tailored for the different matrix multiplications being concurrently being performed.

It should also be noted that although the down-conversion techniques have been described in the context of a neural network accelerator, the techniques described herein can also be applied to other types of buffer circuitry in which the rate of writing data into the buffer differs from the rate of reading data from the buffer. The tradeoff between the storage capacity and precision tradeoffs of the different operating configurations have been described above, and can be tailored for the particular application for which the techniques of present disclosure are being applied.

Figure 8:
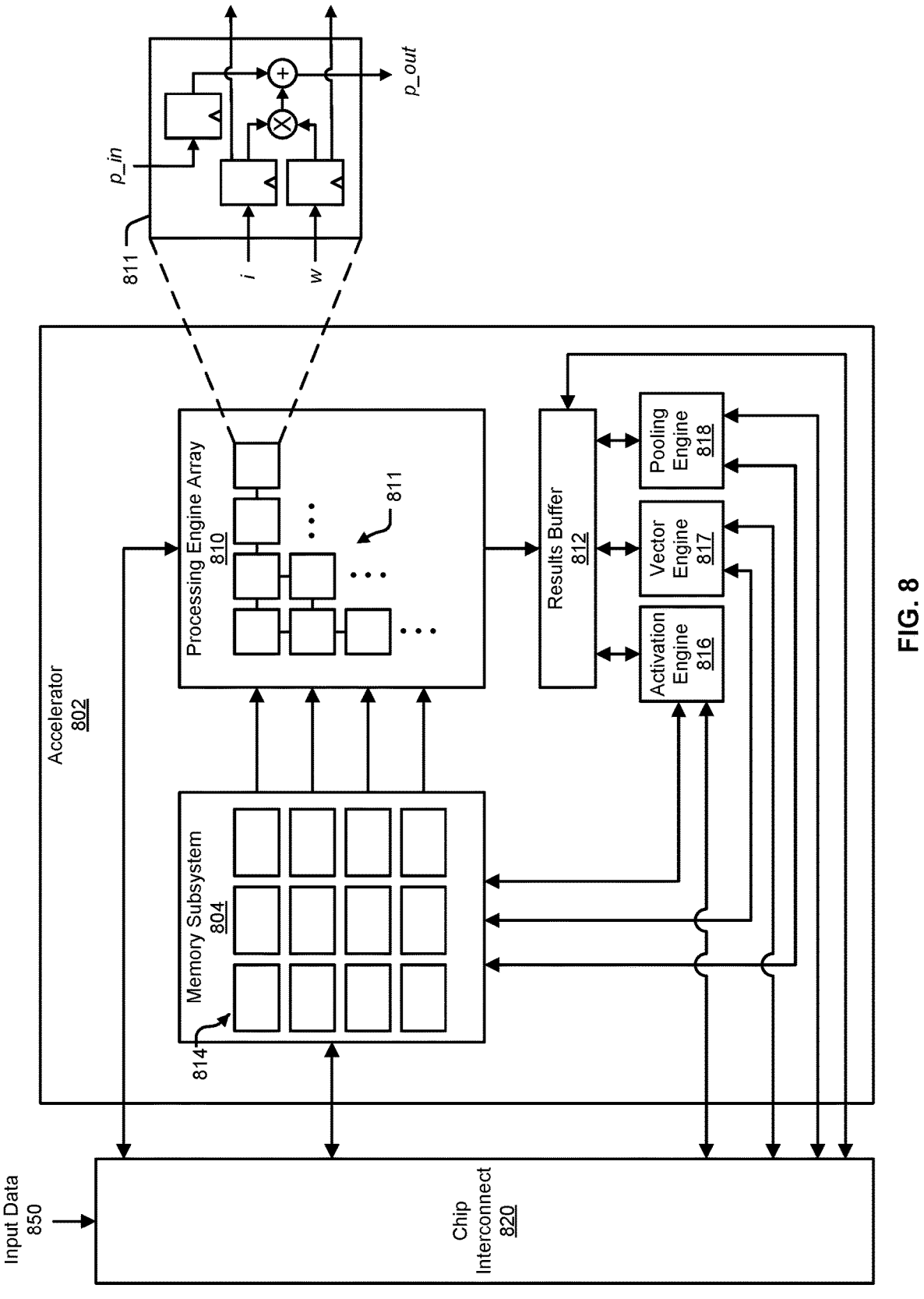
FIG. 8 illustrates a block diagram of an example of an accelerator.

FIG. 8 is a block diagram illustrating an example of an integrated circuit device that can include, for example, neural network processor 100. The example of FIG. 8 illustrates an accelerator 802. In various examples, the accelerator 802, for a set of input data (e.g., input data 850), can execute computations using a processing engine array 810, an activation engine 816, a vector engine 817, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. Memory subsystem 804 can also be referred to as a state buffer (e.g., state buffer 104). In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the vector engine 817, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816, the vector engine 817, and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 128 rows, or some other number of columns and/or rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812 (e.g., partial sum buffer 112). The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818.

Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

In some implementations, the accelerator 802 can further include a vector engine 817. Vector engine 817 is a compute engine that can perform computations and manipulations on values stored in memory subsystem 804 and/or results buffer 812 such as values representing matrices of input values, weight values, intermediate results, etc. Vector engine 817 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 817 can operate in parallel and/or simultaneously. In some examples, the vector engine 817 can be bypassed or be omitted.

Herein, the activation engine 816, the vector engine 817, and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816, the vector engine 817, and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
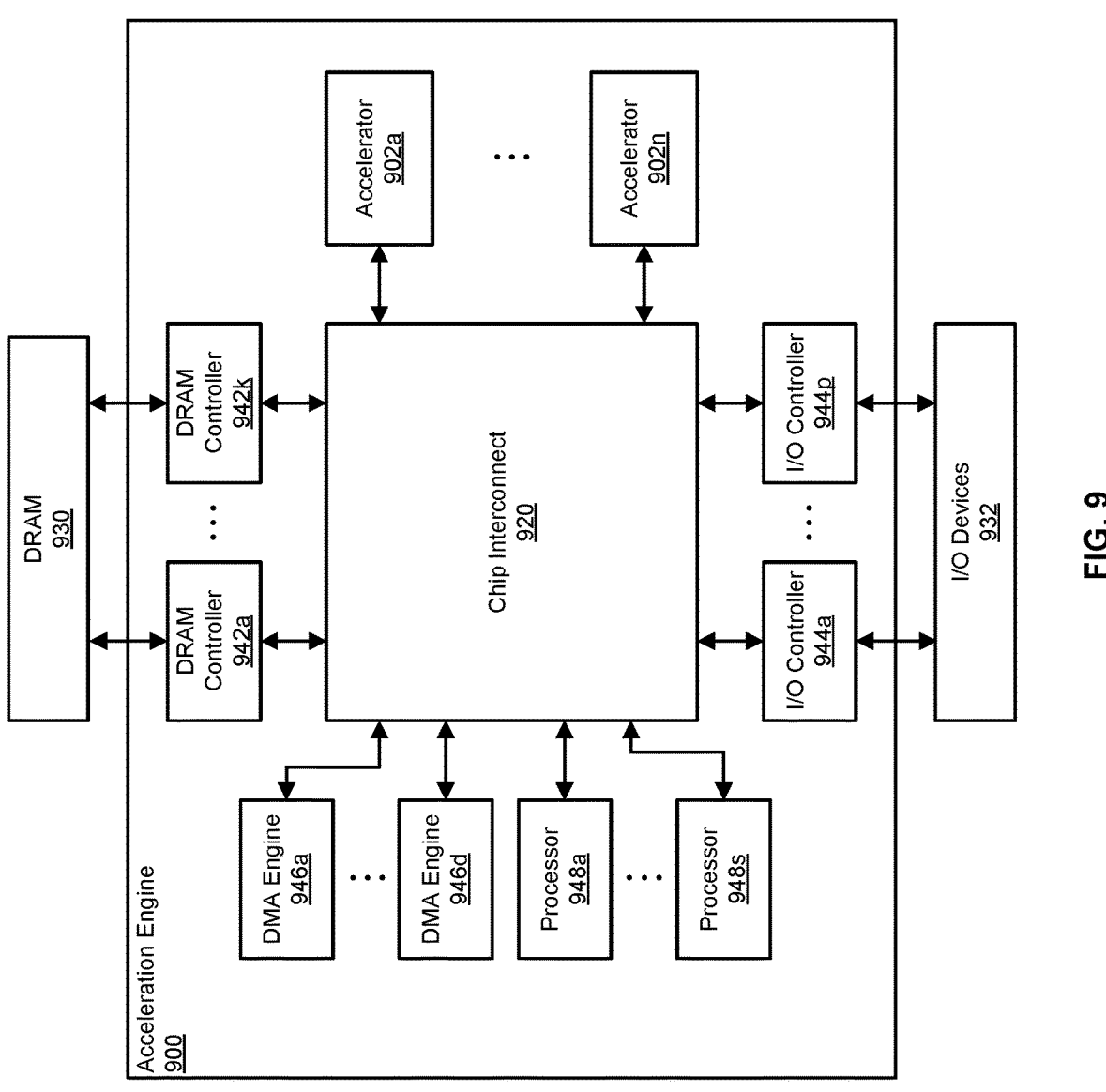
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n are for particular types of operations, so that the accelerators 902a-902n can perform the operations much faster than when similar operations are performed by a general-purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
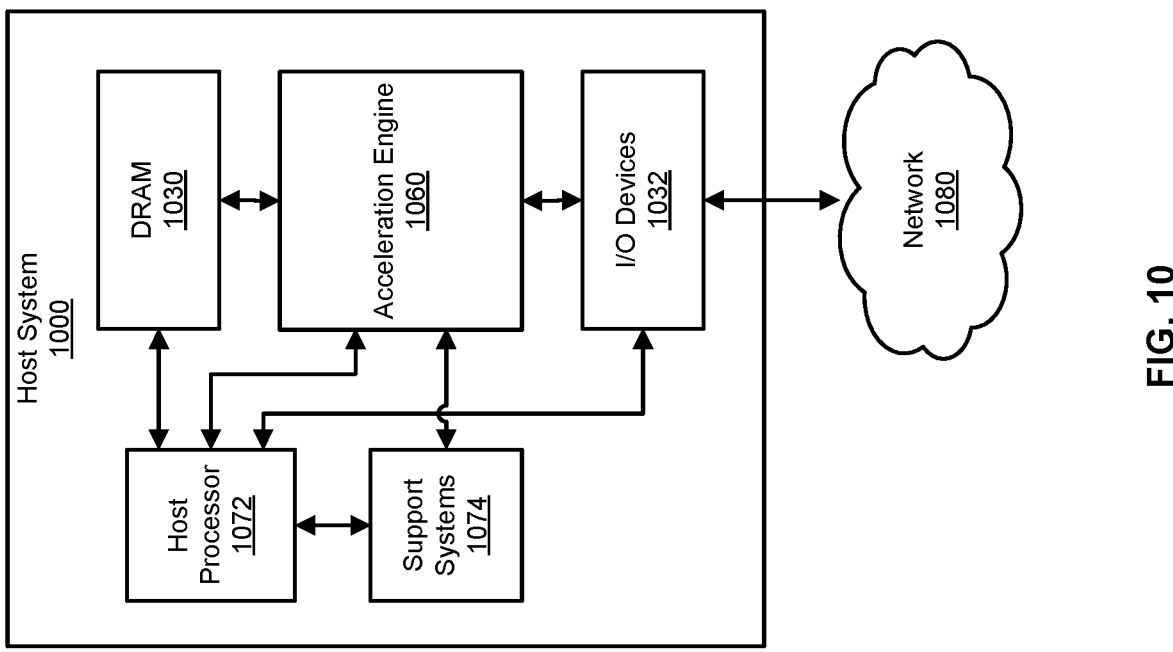
FIG. 10 illustrates a block diagram of an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general-purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:
   a memory operable to store computational results;
   a write interface operable to write the computational results received at a first frequency into the memory;
   a read interface operable to read the computational results from the memory and output the computational results at a second frequency, the second frequency being different from the first frequency; and
   a down-converter operable to perform down-conversion of the computational results from a high precision format into a low precision format by rounding the computational results,
   wherein the down-conversion is performed when writing the computational results into the memory or when reading the computational results from the memory.

2. The integrated circuit device of claim 1, wherein the computational results are stored in the high precision format in the memory, and the down-conversion is performed on the computational results when the computational results are read from the memory.

3. The integrated circuit device of claim 1, wherein the computational results are stored in the low precision format in the memory, and the down-conversion is performed on the computational results when the computational results are written into the memory.

4. The integrated circuit device of claim 1, wherein the integrated circuit device is operable to switch between down-converting the computational results when writing the computational results into the memory and down-converting the computational results when reading the computational results from the memory.

5. The integrated circuit device of claim 1, wherein the down-converter is operable to perform round-to-the-nearest-even, round-up, round-down, or round-to-zero on the computational results.

6. The integrated circuit device of claim 1, wherein the down-converter is operable to perform stochastic rounding on the computational results.

7. The integrated circuit device of claim 1, wherein the down-converter is operable to switch between performing round-to-the-nearest-even and stochastic rounding.

8. The integrated circuit device of claim 1, wherein the high precision format is a 32-bit floating-point (FP32) format, and the low precision format is a 16-bit floating-point (FP16) format, a 16-bit brain floating-point (BF16) format, or an 8-bit floating-point (FP8) format.

9. The integrated circuit device of claim 1, wherein the first frequency is higher than the second frequency.

10. The integrated circuit device of claim 1, wherein the memory includes an adder to accumulate the computational results being written to the memory.

11. The integrated circuit device of claim 1, further comprising a processing engine array operable to generate the computational results as partial sums in the high precision format, wherein the processing engine array includes processing engines arranged in rows and columns, wherein each of the processing engines is operable to perform a multiply-and-add operation.

12. The integrated circuit device of claim 11, further comprising a compute engine operable to obtain the computational results in the low precision format from the memory, and perform computations on the computational results in the low precision format.

13. The integrated circuit device of claim 12, wherein the compute engine includes one or more of an activation engine, a pooling engine, or a vector compute engine.

14. The integrated circuit device of claim 12, wherein the compute engine operates at half a frequency of the processing engine array.

15. The integrated circuit device of claim 1, wherein the low precision format contains half a number of bits as the high precision format.

16. A method comprising:
   receiving, in parallel, computational results in a high precision format at a write interface for storing into a memory at a first frequency;
   storing the computational results in the memory;
   rounding the computational results by a down-converter connected to the memory using round-to-the-nearest-even or stochastic rounding to down-convert the computational results from the high precision format to a low precision format in parallel; and
   outputting the computational results in the low precision format in parallel from the memory at a second frequency by a read interface, the second frequency being different from the first frequency,
   wherein the down-conversion is performed when writing the computational results into the memory or when reading the computational results from the memory.

17. The method of claim 16, wherein the computational results are stored in the high precision format in the memory, and the rounding of the computational results is performed after the computational results are read from the memory.

18. The method of claim 16, wherein the computational results are stored in the low precision format in the memory, and the rounding of the computational results is performed before writing the computational results into the memory.

19. The method of claim 16, wherein the high precision format is a 32-bit floating-point (FP32) format, and the low precision format is a 16-bit floating-point (FP16) format, a 16-bit brain floating-point (BF16) format, or a 8-bit floating-point (FP8) format.

20. The method of claim 16, wherein the first frequency is higher than the second frequency.

* * * * *